United States Patent [19]

Elser

[11] 4,198,898
[45] Apr. 22, 1980

[54] SERVO STEERING GEAR

[75] Inventor: Dieter Elser, Essingen-Lauterburg, Fed. Rep. of Germany

[73] Assignee: Zahnradfabrik Friedrichshafen AG., Friedrichshafen, Fed. Rep. of Germany

[21] Appl. No.: 937,750

[22] Filed: Aug. 29, 1978

[30] Foreign Application Priority Data

Sep. 1, 1977 [DE] Fed. Rep. of Germany ....... 2739405

[51] Int. Cl.² .............................................. F15B 9/10
[52] U.S. Cl. ............................... 91/375 A; 74/388 PS; 92/110
[58] Field of Search ................. 91/375 A, 375 R, 380; 74/388 PS; 92/110, 111; 180/132, 148

[56] References Cited
U.S. PATENT DOCUMENTS

| | | |
|---|---|---|
| 3,291,002 | 12/1966 | Folkerts .......................... 91/375 A |
| 3,362,248 | 1/1968 | Meyers . |
| 3,733,967 | 5/1973 | Dutley .............................. 91/375 A |
| 3,935,790 | 2/1976 | Goff .................................. 91/375 A |

FOREIGN PATENT DOCUMENTS

| | | |
|---|---|---|
| 2231554 | 5/1974 | France .............................. 91/375 A |
| 966431 | 8/1964 | United Kingdom .................. 91/375 A |

*Primary Examiner*—Paul E. Maslousky
*Attorney, Agent, or Firm*—Zalkind & Shuster

[57] ABSTRACT

A compact construction for a vehicle steering gear is provided of the rotary valve type which utilizes a torque rod having an end connected to a worm shaft and the opposite end connected to a steering spindle wherein axial load oil pressure on the torque rod is minimized to avoid breakage. This is accomplished by hydraulic circuitry which routes high inlet pressure to the valve housing directly to the valve grooving instead of to an end of the valve body where it would exert an axial force on the torque rod.

4 Claims, 3 Drawing Figures

SERVO STEERING GEAR

This application is a companion to an application filed by the same inventor, Dieter Elser, on the same date, Aug. 29, 1978, Ser. No. 937,752, having the same disclosure but claiming a different portion of the construction.

The construction utilizes for the most part a conventional arrangement of a steering gear housing which serves as a double acting servomotor having pressure chambers with an intermediate piston carrying a gear rack meshing with a gear sector that operates a steering mechanism, all in the usual construction and fashion. The invention herein utilizes a valve spool having grooves and bores as part of a novel hydraulic circuitry within the housing for flow control to and from the pressure chambers, which valve spool has limited relative rotation with respect to a valve sleeve having coacting grooves and wherein the steering spindle extends outwardly of the housing and connects within the housing with a worm shaft via a torque rod, all of which operates in a known fashion as generally described in prior art German patent OS No. 2 426 201.

Thus in the prior art the hydraulic circuitry within the housing commences with an inlet port adjacent an end of the valve spool and then via valve control by way of the torque rod spacing between the torque bar and the worm shaft to one chamber or the other of the power cylinder depending on direction of rotation of the steering spindle. This places a heavy axial load on the torque rod which combined with the torsional stress during operation leads to breakage.

The present invention avoids the drawback by providing an inlet port for high pressure at one end of the housing and directed at the control grooving of the valve elements so that no pressure is exerted axially on the valve spool. Whereas in the prior art the toroidal space between the torque rod and interior of the worm shaft carries high pressure fluid, in the present invention it is utilized for return, i.e., exhaust flow.

Novel hydraulic circuitry herein for oil return comprises an axial bore in the valve spool, passage through the worm shaft and transverse bores in a flange at an end of the worm shaft adjacent the outlet port at the end of the housing including an annular groove at that end of the housing intermediate such bores and the outlet port.

Thus return oil under low pressure effects no axial loading of the torque rod or valve means, the pressure being that only needed to meet flow resistance.

The torque rod connects, at the outlet port end of the housing, with the worm shaft by an adjustable securing device which can effect adjustment of the valve spool relative the valve sleeve.

A detailed description of the invention now follows in conjunction with the appended drawing in which.

Figure 1:
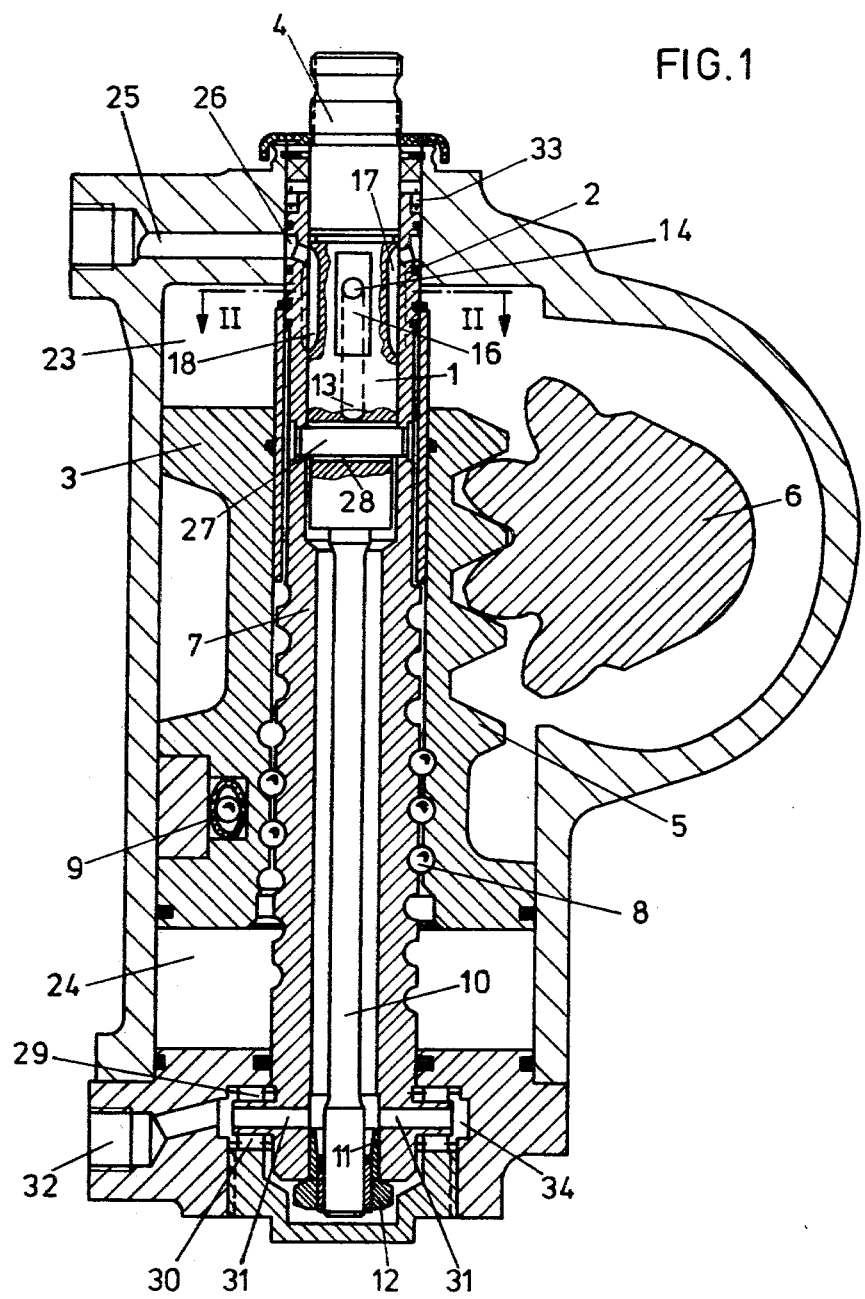
FIG. 1 shows a longitudinal section through the mechanism shown as assembled and carried by a housing.

Referring to the drawing, the essential components of the invention comprise, e.g., a valve means having a spool 1 which has longitudinal flow control grooves or channels and is connected with a steering spindle 4 rotative thereby within a longitudinally channelled valve sleeve 2 which is integral with the steering worm shaft 7. The housing effects a servomotor double acting cylinder to effect a steering booster arrangement wherein double acting pressure cylinder has therein the piston 3 with integral gear rack. Upon rotation of steering spindle 4 piston 3 moves axially in a conventional manner with power boost via ball chain 8 having ball return tube 9, or by manual force if pressure fails. Gear rack 5 meshes with the gear sector 6 in the housing, for rotation thereof, upon movement of piston 3 understood to actuate a mechanical steering linkage (not shown).

The worm shaft 7 has the usual threaded drive connection with the piston, comprising the ball chain 8 whereby manual rotation of the worm shaft can control or effect reciprocal motion of the piston as above mentioned, but wherein the bore in the piston through which the worm shaft passes completely is used as a flow channel, as part of the hydraulic circuit, flow occurring between the worm shaft and the bore wall. For operation of the spool valve 1, worm shaft 7 is connected at one end to a torque rod 10 which connects to the steering spindle 4, connections being at the ends of the torque rod. Thus, one end of the rod connects to the worm shaft and the other end connected with the body of spool valve 1 at one end of the valve spool opposite the end from which steering spindle 4 extends. Connection between the worm shaft 7 and the torque rod 10 is effected by a taper collect sleeve 11 compressed in clamping action by means of a nut 12 as shown and this arrangement serves for holding longitudinal adjustment of the valve spool. FIG. 1A shows the specific arrangement for the torque rod clamp utilizing a taper collet means comprising the taper collet 11 having the usual split end 11A exteriorily tapered so as to be engageable with the usual internal taper bushing 11B which abuts against the nut 12 threadedly carried on the taper collet 11. Accordingly, it will be apparent that when the nut 12 is tightened against the end of the worm shaft 7 which it abuts, it will draw the taper collet to compress the split tapered end within the bushing 11B thus clamping the split end 11A around torque rod 10 and securely locking it in any fixed longitudinal position within worm shaft 7. Split end taper collets of the above type have heretofore been generally known and used for various purposes and are, for example, shown in such U.S. Pat. as Nos. 906,869; 1,349,832; 2,071,954; 3,481,131; 3,499,223. The valve spool connection with the torque rod is via a drive pin 27, later discussed.

Upon rotation of the steering spindle 4, worm shaft 7 will be rotated by torsional stress twisting of the torque rod 10 causing a certain amount of relative rotation between the valve spool 1 and the worm shaft 7 and valve sleeve 2 due to such twisting of the torque rod, a known effect, whereby the controlled flow for pressurizing and exhausting the power booster cylinder takes place through the channeling of the valve means and other passages intermediate the various components to effect hydraulic circuitry.

Figure 2:
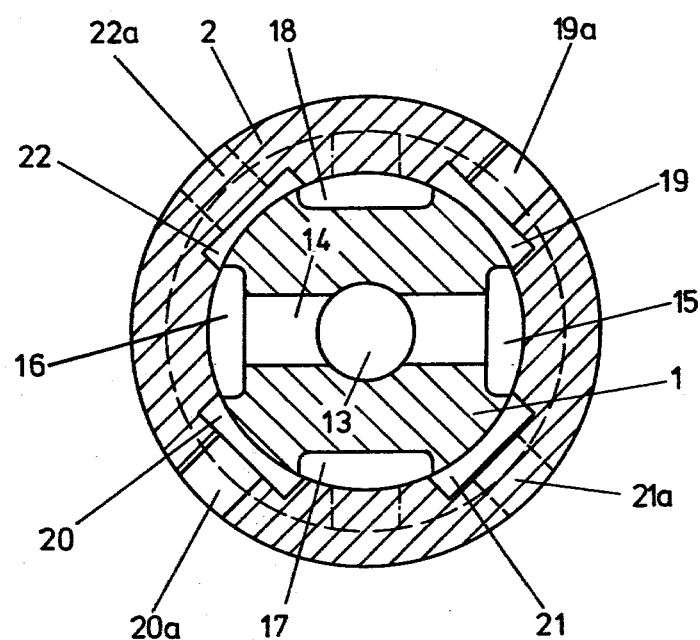
FIG. 2 is a section on the line II—II of FIG. 1 to an enlarged scale.

Thus, when steering spindle 4 is rotated, communication of pressure oil in the valve means (FIG. 2) occurs via grooves 15, 16 and 17, 18 of the valve spool into coacting respective grooves 19, 20 and 21, 22 of valve sleeve 2 which latter pairs of grooves connect with bores leading to the respective pressure chamber spaces 23 and 24 at the end faces of the piston 3 within the cylinder. Bores 19a and 20a lead to the pressure chamber 23 while the bores 21a and 22a lead to the pressure chamber 24 through the spacing afforded by ball chain 8, i.e., oil flow is through the annular gap between the exterior of the worm shaft 7 and the interior of the piston 3 through which the worm shaft passes, namely through the region of the ball chain 8. Oil communication is thus had to pressurize or exhaust pressure chambers 23 and 24 responsive to directional rotational movement of the steering spindle to assist steering. Thrust impact from the roadway is counteracted by the arrangement which achieves very quick response of hydraulic booster support.

Figure 1A:
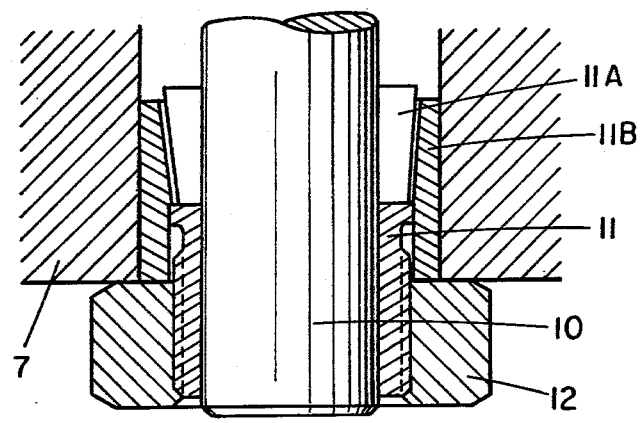
FIG. 1A is an enlarged detail of the taper collet clamp.

Pressure inflow into the steering gear housing is effected by a housing bore 25 and annular gooove 26 on the valve sleeve exterior communicating with the groove 17 and 18 of the valve spool 1 (FIG. 1).

Intermediate the valve means, specifically the spool component thereof, and the torque rod end 10, integral therewith, as shown, a pin 27 secured in valve sleeve 2 is provided through bore 28 of the valve spool body, as shown, which bore is slot shaped or oblong so that pin 27 has no longitudinal play with respect to the valve spool 1 but is allowed play transversely. Return oil is via bore 28 connecting with central bore 13 and cross bar 14 of the valve spool 1 as well as through the concentric space between torque rod 10 and worm shaft 7. However, in order to facilitate return of oil to bore 28, pin 27 may be necked down in the area of central bore 13 or central bore 13 may be countersunk or enlarged at the juncture with bore 28.

Oil is then conducted by way of a pair of cross bores 31 in a flange extending between axial bearings 29 and 30 and thence via annular groove 34 in the end cap, as shown, to return or outlet port 32. Intermediate steering spindle 4 and worm shaft 7 a suitable radial bearing 33, for example, a needle bearing is provided.

Pin 27, as will be seen is both a motion limiting and driving pin wherein it limits relative motion between the valve spool and valve sleeve when the steering shaft is rotated and then effects rotative drive of the worm shaft upon continued rotation of the steering. As seen in FIG. 1 the spacing between pin 29 and bore 28 is exagerated for illustrative clarity.

Upon rotation of steering spindle 4 causing initially a slight rotation of valve spool 1 relative valve sleeve 2 due to twisting of torque rod 10, either cylinder chamber 23 or 24 is pressurized by the coaction of the valve means grooves effecting flow communication, depending upon direction or rotation of the steering spindle, the opposite chamber being connected for oil return as will be apparent from the hydraulic circuitry. However, such rotation continues only until pin 27 engages an edge of bore 28. Thus, pin 27 is a motion limiting of stop pin for the relative rotation. Even in the event of a break of the torque rod 10 booster pressure would continue to function in the cylinder since only the automatic mechanical return of the spool valve 1 normally provided by the torque rod 10 would not be functioning.

Should the hydraulic pressure source fail, manual force on the steering spindle would then be transmitted through pin 27 to rotate worm shaft 7 in order to reciprocate piston 3 for rotation of gear sector 6 to effect vehicle steering. Thus, pin 27 is also driving pin for transmission of manual force to reciprocate piston 3 to steer the vehicle if need be.

I claim:

1. In a power steering gear of the kind having a housing which comprises a double acting power cylinder housing a piston therein intermediate pressure chambers at respective ends of the housing including a rotary steering spindle (4); a valve means adjacent one end of said housing and comprising a valve spool (1) rotative with said steering spindle and also including a torque rod (10) and hollow worm shaft (7) passing through said piston wherein said torque rod extends through said worm shaft and connects said worm shaft with said steering spindle; said valve means including a valve sleeve (2) in said housing rotative with said worm shaft wherein said valve spool and valve sleeve have coacting flow control channels operational to control flow to and from said cylinder chambers upon relative rotation;

the improvement including hydraulic circuitry in said housing which comprises a pressure inlet (25) at said one end of said housing adjacent the valve means and passages therefrom for inlet pressure flow to either cylinder chamber; an outlet (32) at the other end of said housing, the hollow worm shaft effecting a passage therethrough for connection only of outlet flow from said valve means to said outlet from either cylinder chamber.

2. In a power steering gear as set forth in claim 1, a radial flange on said worm shaft having bore means (31) therethrough for flow communication from the interior of said worm shaft to said outlet; and means for supporting said worm shaft rotatively at said other end of said housing comprising bearings (29, 30) on opposite sides of said flange; said housing having an annular groove (34) for flow communication between said bore means and said outlet.

3. In a power steering gear as set forth in claim 1 or 2, including a taper collet means between the torque rod and the worm shaft comprising a taper collet sleeve (11) having a tightening nut (12) abutting an end of said worm shaft whereby rotation of said nut effects collet compression for clamping said torque rod within said worm shaft and axial fixing therein.

4. In a power steering gear as set forth in claim 1, including means at said other end of said housing separating the respective cylinder chamber from said outlet.

* * * * *